(12) United States Patent
Arevalo

(10) Patent No.: US 9,343,892 B1
(45) Date of Patent: May 17, 2016

(54) MUSHROOM-SHAPED HIGH VOLTAGE ELECTRODE

(71) Applicant: ABB Technology Ltd, Zürich (CH)

(72) Inventor: Liliana Arevalo, Ludvika (SE)

(73) Assignee: ABB TECHNOLOGY LTD, Zürich (CH)

( * ) Notice: Subject to any disclaimer, the term of this patent is extended or adjusted under 35 U.S.C. 154(b) by 0 days.

(21) Appl. No.: 14/896,250

(22) PCT Filed: Jun. 19, 2013

(86) PCT No.: PCT/EP2013/062672
§ 371 (c)(1),
(2) Date: Dec. 4, 2015

(87) PCT Pub. No.: WO2014/202126
PCT Pub. Date: Dec. 24, 2014

(51) Int. Cl.
H02G 15/08 (2006.01)

(52) U.S. Cl.
CPC .................... H02G 15/08 (2013.01)

(58) Field of Classification Search
USPC ............................ 174/146, 138 H
See application file for complete search history.

(56) References Cited

U.S. PATENT DOCUMENTS

| 2,789,154 | A | | 4/1957 | Peterson |
| 3,585,277 | A | * | 6/1971 | Lewis ............ H02G 7/12 174/146 |
| 5,790,388 | A | | 8/1998 | Buckingham |
| 6,087,590 | A | * | 7/2000 | Meinherz ........ H02G 5/061 174/24 |
| 8,003,888 | B2 | * | 8/2011 | Owen, Sr. ....... H02G 1/14 174/135 |
| 8,093,501 | B2 | * | 1/2012 | Stansberry, Jr. ... H02G 7/05 174/146 |

FOREIGN PATENT DOCUMENTS

| BE | 824.544 A1 | 5/1975 |
| CN | 201608424 U | 10/2010 |
| JP | 51-49817 U | 4/1976 |
| WO | WO 2012/003074 A1 | 1/2012 |

* cited by examiner

Primary Examiner — Dhirubhai R Patel
(74) Attorney, Agent, or Firm — Birch, Stewart, Kolasch & Birch, LLP

(57) ABSTRACT

A high voltage electrode arrangement includes a dome-shaped top portion, a toroid-shaped bottom portion, and an intermediate portion for connecting the top portion and the bottom portion. The intermediate portion includes a lead-trough for receiving high voltage equipment to be interconnected.

11 Claims, 2 Drawing Sheets

MUSHROOM-SHAPED HIGH VOLTAGE ELECTRODE

TECHNICAL FIELD

The invention relates to a high voltage electrode arrangement.

BACKGROUND

The insulation design of high voltage apparatus and stations is determined by the switching impulse withstand levels and the creepage distance requirements, among other parameters. The increment of high voltage transmission levels has produced the rise of the switching withstand requirements. In order to reduce electrode surfaces stresses and to improve the voltage withstand capabilities, electrodes with large curvature radii are widely used in high voltage apparatus, bus terminals and interconnections. The electrodes should provide a point free of corona and also fulfil the breakdown requirements according to the level of voltage of the station. The most important electrical characteristics of an electrode in dielectric gas from the insulation point of view are inception of corona discharges and breakdown voltage characteristics. Corona discharges are self sustainable partial discharges close to the highly stressed electrode. For indoor condition, the shape of the electrode and the length of clearance should be so determined that corona discharge will not occur under maximum operation voltage. The inception voltage of corona discharges is determined by the air gap geometry and atmospheric conditions, such as density and humidity.

Further development of the corona discharge with the increasing of the applied voltage may lead to the breakdown of air clearance. For external insulation design the shape of the electrode and the length of the clearance should be so determined that the breakdown of the clearance will not occur under over-voltage. A breakdown of air gap will start from corona inception and then the further development of stronger discharge activities.

Spherical electrodes are used e.g. in high voltage direct current (HVDC) valve halls for interconnecting various electrical equipment such as busbars, transformers and valves, busbars and bushings, and support insulators. The diameter of such spherical electrodes depends on the maximum voltage to be handled at an electrode interconnection point determined by the insulation coordination requirements, i.e. requirements of the electric strength of equipment in relation to the voltages which can appear on the system for which the equipment is intended. The aim of such a spherical electrode is to provide a more lenient electric field at the interconnection point and to prevent electrical stress such as corona discharges and breakdown of the air clearance.

Calculation of the clearance distances for electric equipment in the valve hall are based on switching impulse withstand voltage requirements, i.e. an overvoltage applied which an insulation media should be able to withstand at switching impulse operation. The clearance distance depends on the so called gap factor provided by the electrode (relation of the breakdown voltage of the arrangement at certain distance with the breakdown voltage of a point-plane arrangement at the same gap distance) and the breakdown media (insulators or air). If the electrode can provide a high switching impulse withstand voltage, the clearance distance that will fulfil the insulation requirements will be smaller than the clearance distance calculated with an electrode of a lower switching impulse withstand level capabilities.

The insulation distances of the electric equipment to ground plane are mainly formed by a combination of post insulators and top electrode and/or a combination post insulators, pedestal insulator and top electrode. Hence, the spherical/corona electrode is typically arranged on top of one or more vertically arranged post insulators. Possibly, the post insulators are arranged on top of a pedestal insulator arranged on the floor of the valve hall. Field tests using spherical electrodes have shown that to fulfil insulation requirements for indoor conditions at high voltages like 800 kV DC, the length of the post insulators should be 8 meters or larger and the pedestal insulator used should be at least 2.4 meters, implying that the spherical electrode is arranged at a height of 10.4 meters in the valve hall.

As HVDC operational voltages have been increased, the insulation requirements are increasingly harsher. To be able to meet the insulation requirements, the diameter of the corona free electrodes (e.g. spherical electrodes) has been increased. For interconnections in valve hall, the spherical electrodes for initial projects used 1.3 meters diameters, and currently 800 kV DC projects use spherical electrodes of 1.8 meters diameter or more. With the increase of the insulation requirements, the electrode diameter and the length of the post insulators used in the station have been increased.

However, the increase in electrode diameter is neither directly proportional to the increase in gap factor, nor to the increase in withstand voltage of the electrode. In addition, the relation breakdown voltage versus total length of pedestal and post insulators is not linear, and therefore an increase in post insulator length will not directly increase the breakdown voltage capabilities of the set-up. Experimental and theoretical research has shown that the relation between breakdown voltage and gap distance for spherical electrodes has a tendency to saturate, i.e. it does not matter in practice at what height the high voltage electrode is arranged, the breakdown voltage of the electrode will not increase over a certain height. This saturation point is however difficult to predict and the physical behaviour of the breakdown for this kind of set-up is complex and thus difficult to model.

Research has shown for an 1100 kV DC system spherical electrode with a diameter of 2 meters and insulation distance of 15 meters or more, the minimum 50% switching impulse withstand voltage required can not be fulfilled. Additionally, saturation of the gap is reached and higher voltages can not be reached by increasing insulation length, distance to floor or electrode diameter.

SUMMARY

An object of the present invention is to solve, or at least mitigate, this problem in the art and to provide an improved high voltage electrode arrangement.

This object is attained according to an aspect of the present invention by a high voltage electrode arrangement comprising a dome-shaped top portion, a toroid-shaped bottom portion, and an intermediate portion for connecting the top portion and the bottom portion, which intermediate portion comprises a lead-trough for receiving high voltage equipment to be interconnected.

Advantageously, with a dome-shaped top portion, stresses of electric field at the top of the electrode, for instance against the ceiling in the structure (e.g. a valve hall) in which the electrode arrangement is arranged are reduced and any inhomogeneous electric field is avoided at the top portion. The dome-shaped portion of the electrode smooths equipotential lines towards any object located in proximity of the top of the electrode, in such a way that any irregularity or disturbance from an object close to the top of the electrode will not significantly disturb the electric field, avoiding the inception of corona. The top portion of the arrangement reduces the concentration of electric field at top of the electrode (contrary to e.g. a sphere where the electric field is distributed equally all around the sphere) and consequently the presence of small holes or protrusions will only have a small effect on the electric field distribution at the top of the electrode. Further advantageous is that the bottom portion is toroid-shaped with a sufficient internal diameter to smooth the electric field against surrounding equipment (e.g. walls and ground plane). The bottom portion is designed in a way that helps the electric field lines from the arrangement to fall smoothly towards the walls and the ground plane. The equipotential lines of the complete arrangement are distributed uniformly, avoiding points of concentration of electric field. Therefore stresses towards the side, the bottom and top of the electrode become more homogeneous and do not disturb the electrostatic behaviour of the electrode. Even though the top portion is exemplified as being ellipsoid-shaped, other dome shapes can be envisaged.

After high voltage tests and breakdown simulations, the electrode arrangement of the present invention has shown to be capable of withstanding voltages much higher than spherical electrodes. The electrode arrangement provides good switching impulse withstand voltage capabilities. Therefore, the insulation length needed to fulfil the insulation requirements will be smaller as compared to the necessary insulation lengths for spherical electrodes. Field tests has for instance shown that to fulfil requirements of breakdown withstand voltages of 2650 kV for the electrode arrangement of the present invention, post insulators of a total length of 6 meters and a pedestal insulator of 2.4 meters are required, meaning that the electrode arrangement will be positioned at a height of 8.4 meters above the floor in a valve hall, which is advantageously low.

The electrode arrangement of the present invention reduces the electric field in such a way that inhomogeneous electric fields can be hidden inside its "mushroom"-shaped configuration such that the surrounding electrical environment will experience a quasi-homogenous electric field. In other words, the electrode smooths the electric field. The equipotential lines generated by the mushroom-shaped electrode arrangement of the present invention are of elliptical shape. Therefore, from the point of view of a grounded object located on top or bottom of the electrode there is no notable concentration of electric field, and the electric field will be perceived as uniformly distributed. A diameter of a horizontal axis of the complete arrangement, said diameter of which horizontal axis coincides with the diameter of the bottom portion, is large enough to avoid concentration of electric field and avoid inception of corona or breakdown. The shape of the equipotential lines of the complete arrangement towards the sides is paraboloid, with a sufficiently large bottom radius preventing the generation of concentration of electric fields towards the electrode that could generate inception of corona and/or electrical breakdown. The bottom and top portions of the electrode arrangement are attached in a manner such that irregularities of connections and joints can be hidden inside the electrode arrangement and will not disturb the electric field distribution generated by the geometry of the arrangement.

Advantageously, since the electrode arrangement of the present invention provides a better switching impulse withstand voltage than those in the art, the clearance distances of the valve hall can be reduced, i.e., the size of the valve hall could be reduced because shorter distances to wall and to floor are required. This gives economical benefits in buying land and in the construction of the valve hall. This will further also advantageously imply that fewer post insulators are needed due to the reduced clearance distances, which in its turn will result in a more stable arrangement being advantageous for e.g. seismic reasons.

A reduced number of post insulators further has the advantage that standard type post insulators can be used to a greater extent; if the number of post insulators is high due to the large clearance distances, they must also have a greater diameter in order to provide stability to the electrode arrangement. Thus, it will not be possible to use off-the-shelf post insulators when clearances distances increase.

Further, the lower the number of post insulators, the easier the installation and the shorter the installation time.

In an embodiment of the present invention, the high voltage electrode arrangement further comprises a cylindrical portion arranged in the toroid-shaped bottom portion, which cylindrical portion circumferentially contacts the toroid-shaped bottom portion along the inside of the toroid-shaped bottom portion. Thus, the toroid-shaped bottom portion is arranged with a plate around its rotational axis for advantageously homogenizing the electric field in a direction towards the floor in the valve hall, and to hide any connections or joints present at the intermediate portion of the electrode arrangement where electrical equipment is interconnected. The cylindrical portion/plate has a shielding function and further accommodates and hides wires and other types of connections.

In a further embodiment of the present invention, the high voltage electrode arrangement is arranged such that diameter of the dome-shaped top portion is greater than diameter of the toroid-shaped bottom portion. Advantageously, this reduces the risk of having points of concentration of electric field at the rounded edges of the mushroom-shaped electrode arrangement.

In yet a further embodiment of the present invention, the high voltage electrode arrangement is further arranged such that diameter of the ellipsoid-shaped top portion in an x-direction is substantially equal to diameter of the ellipsoid-shaped top portion in a y-direction. Thus, the top portion will have a substantially circular cross section taken horizontally.

In still a further embodiment of the present invention, the high voltage electrode arrangement is further arranged such that the ellipsoid-shaped top portion is planar in an x-y-direction at an end of the top portion facing the toroid-shaped bottom portion.

In further embodiments of the present invention, the high voltage electrode arrangement further comprises post insulator(s) and even a pedestal insulator.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
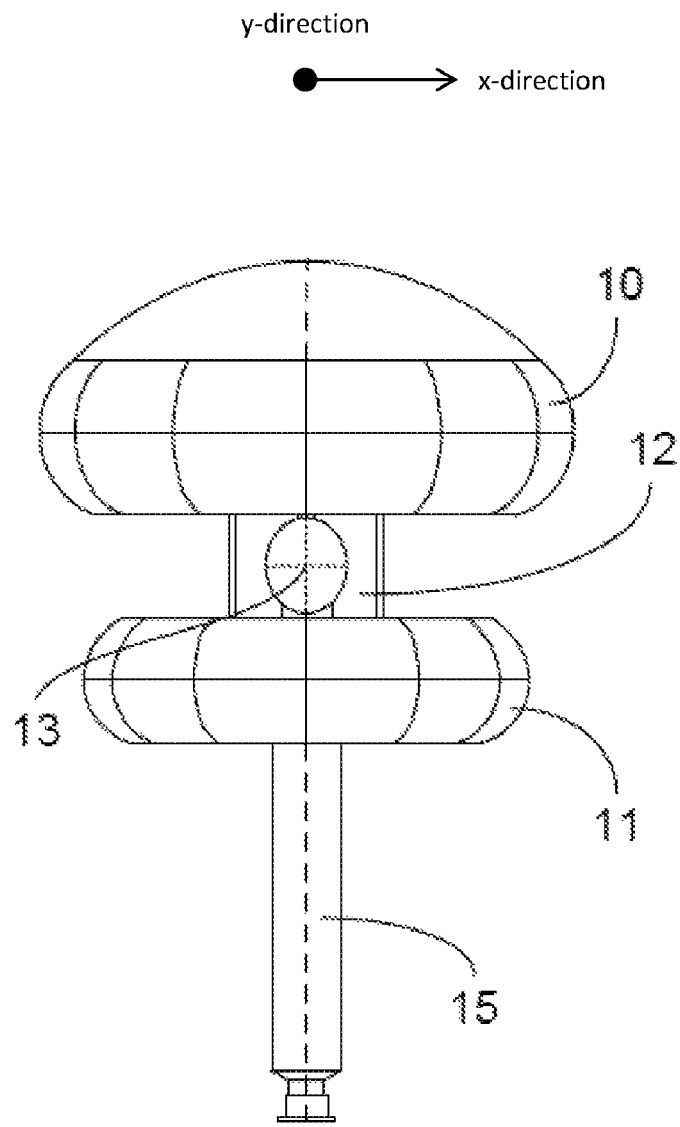
FIG. 1 illustrates, in a side view, a high voltage electrode arrangement according to an embodiment of the present invention.

FIG. 1 illustrates, in a side view, a high voltage electrode arrangement according to an embodiment of the present invention. The electrode arrangement comprises a dome-shaped top portion 10, a toroid-shaped bottom portion 11, and an intermediate portion 12 for connecting the top portion 10 and the bottom portion 11, which intermediate portion 12 comprises a lead-trough 13 for receiving electric equipment to be interconnected. The electric equipment may comprise any equipment requiring protection against corona breakdown such as e.g. surge arresters, bushings, busbars, support insulators, transformers to valves, etc. FIG. 1 further shows a number of post isolators 15 attached to the electrode arrangement.

As previously has been discussed, with a dome-shaped top portion, stresses of electric field at the top of the electrode are advantageously reduced and any inhomogeneous electric field is avoided at the top portion 10. The dome-shaped top portion 10 of the electrode arrangement of the present invention smooths equipotential lines towards any object located in proximity of the top of the electrode, thus avoiding disturbances of the electric field by objects close to the top-portion 10. Further advantageous is that the dome shape of the arrangement reduces the concentration of electric field at top portion 10 of the electrode. This is in contrast to a prior art spherical electrode where the electric field is distributed equally all around the sphere. Advantageously, according to an embodiment, the top portion 10 is ellipsoid-shaped.

According to yet another embodiment the diameter of the ellipsoid-shaped top portion (10) in an x-direction substantially equal to diameter of the ellipsoid-shaped top portion (10) in a y-direction.

Further advantageous is that the bottom portion 11 is toroid-shaped with a sufficient internal diameter to smooth the electric field against surrounding equipment (e.g. walls and ground plane). The bottom portion 11 is designed in a way that helps the electric field lines from the arrangement to fall smoothly towards the walls and the ground plane. The equipotential lines of the electrode arrangement are distributed uniformly, avoiding points of concentration of electric field. Therefore stresses towards the side, the bottom and top of the electrode become more homogeneous and do not disturb the electrostatic behaviour of the electrode. According to an embodiment, the ellipsoid-shaped top portion is planar in an x-y-direction at an end of the top portion facing the toroid-shaped bottom portion.

Figure 2:
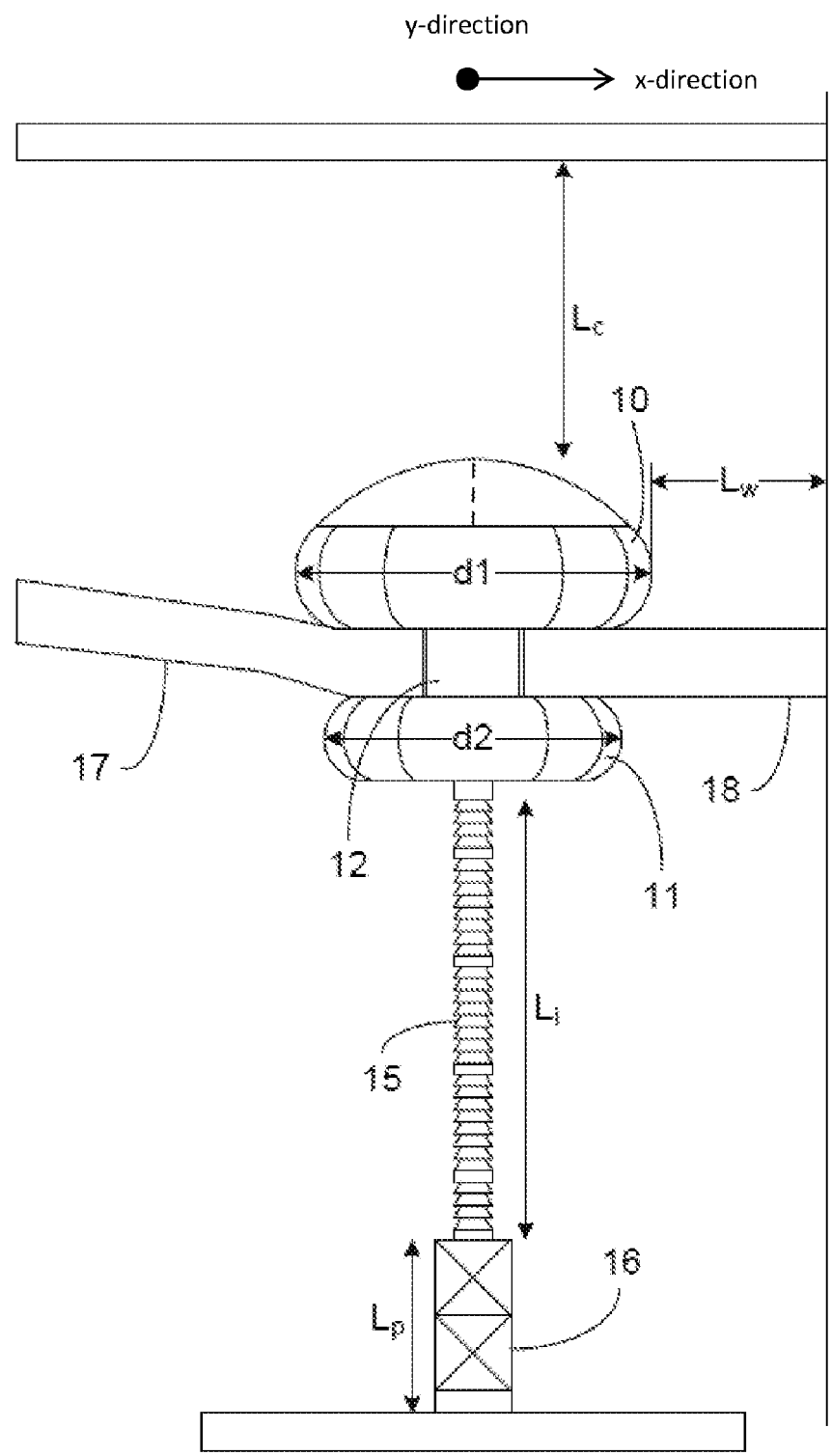
FIG. 2 illustrates a high voltage electrode arrangement according to an embodiment of the present invention mounted onto an isolator structure.

FIG. 2 shows a high voltage electrode arrangement according to an embodiment of the present invention mounted onto an insulator structure arrangement in the form of a plurality of post insulators 15 and a pedestal support 16. Further shown in is a busbar 17 which in practice e.g. may be connected to a transformer bushing (not shown) in a valve hall in which the electrode arrangement is used. Thus, the electrode arrangement comprises a dome-shaped top portion to, a toroid-shaped bottom portion 11, and an intermediate portion 12 for connecting the top portion to and the bottom portion 11, which intermediate portion 12 comprises a lead-trough 13 for receiving electric equipment to be interconnected; in this case the busbar 17 connected to the transformer bushing and a further conductor 18 for outputting HVDC from the valve hall through a wall bushing (not shown).

The electrode arrangement of the present invention reduces the electric field in such a way that inhomogeneous electric fields can be hidden inside its "mushroom"-shaped configuration. This has as an effect that the surrounding electrical environment will experience a quasi-homogenous electric field. In other words, the electrode smooths the electric field. The bottom portion 11 and the top portion 10 of the electrode arrangement are attached in a manner such that irregularities of connections and joints can be hidden inside the electrode arrangement and will not disturb the electric field distribution generated by the geometry of the arrangement.

In an embodiment of the present invention, the high voltage electrode arrangement further comprises a cylindrical portion arranged in the toroid-shaped bottom portion 11, which cylindrical portion circumferentially contacts the toroid-shaped bottom portion along the inside of the toroid-shaped bottom portion. Thus, the toroid-shaped bottom portion 11 is arranged with a plate around its rotational axis for advantageously homogenizing the electric field in a direction towards the floor in the valve hall, and to hide any connections or joints present at the intermediate portion of the electrode arrangement where the busbar 17 from the transformer bushing is interconnected to the further conductor 18 for connection to the wall bushing. The cylindrical portion/plate has a shielding function and further accommodates and hides wires and other types of connections. The cylindrical portion/plate is in an embodiment arranged with an opening at its centre for receiving the insulator 15.

FIG. 2 shows a high voltage electrode arrangement according to an embodiment of the present invention mounted onto the insulator structure in the form of a plurality of post insulators 15 and a pedestal support 16. The diameter d1 of the dome-shaped top portion 10 is greater than the diameter d2 of the toroid-shaped bottom portion 11. Advantageously, this reduces the risk of having points of concentration of electric field at the rounded edges of the mushroom-shaped electrode arrangement, as compared to diameters d1, d2 of equal length, which would concentrate the electric field at the periphery of the electrode.

After high voltage tests and breakdown simulations, the electrode arrangement of the present invention has advantageously shown to be capable of withstanding voltages much higher than spherical electrodes. The electrode arrangement provides good switching impulse withstand voltage capabilities. Therefore, the insulation length needed to fulfil the insulation requirements will be smaller as compared to the necessary insulation lengths for spherical electrodes. Field tests has for instance shown that to fulfil requirements of breakdown withstand voltages of 2650 kV for the electrode arrangement of the present invention, post insulators of a total length Li of 6 meters and a pedestal support of a length Lp of 2.4 meters are required, meaning that the electrode arrangement will be positioned at a height of 8.4 meters above the floor in a valve hall, which is advantageously low.

Advantageously, since the electrode arrangement of the present invention provides a better switching impulse withstand voltage than those in the art, the clearance distances of the valve hall can be reduced, i.e., the size of the valve hall could be reduced because shorter distances to wall (Lw), ceiling (Lc) and to floor (Li+Lp) are required. This gives economical benefits in buying land and in the construction of the valve hall. This will further also advantageously imply that fewer post insulators are needed due to the reduced clearance distances, which in its turn will result in easier and faster installation and a more stable arrangement being advantageous for e.g. seismic reasons. A reduced number of post insulators further has the advantage that standard type post insulators can be used to a greater extent; if the number of post insulators is high due to the large clearance distances, they must also have a greater diameter in order to provide stability to the electrode arrangement. Thus, it will not be possible to use off-the-shelf post insulators when clearances distances increase.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A high voltage electrode arrangement to withstand higher voltage than spherical electrodes, comprising:
   a dome-shaped top portion;
   a toroid-shaped bottom portion; and
   an intermediate portion for connecting the dome-shaped top portion and the toroid-shaped bottom portion,
   wherein the intermediate portion comprises a lead-trough to receive electric equipment to be interconnected, wherein the dome-shaped top portion is ellipsoid-shaped, and a diameter of the dome-shaped top portion is greater than a diameter of the toroid-shaped bottom portion.

2. The high voltage electrode arrangement of claim 1, wherein the intermediate portion is cylindrical-shaped.

3. The high voltage electrode arrangement of claim 2, further comprising a cylindrical plate arranged in the toroid-shaped bottom portion, said cylindrical plate circumferentially contacting an inside of the toroid-shaped bottom portion.

4. The high voltage electrode arrangement of claim 2, wherein the dome-shaped top portion is planar in an x-y-direction at an end of the dome-shaped top portion facing the toroid-shaped bottom portion.

5. The high voltage electrode arrangement of claim 1, further comprising a cylindrical plate arranged in the toroid-shaped bottom portion, said cylindrical plate circumferentially contacting an inside of the toroid-shaped bottom portion.

6. The high voltage electrode arrangement of claim 5, wherein the cylindrical plate receives an insulator.

7. The high voltage electrode arrangement of claim 5, wherein the dome-shaped top portion is planar in an x-y-direction at an end of the dome-shaped top portion facing the toroid-shaped bottom portion.

8. The high voltage electrode arrangement of claim 1, wherein the dome-shaped top portion is planar in an x-y-direction at an end of the dome-shaped top portion facing the toroid-shaped bottom portion.

9. The high voltage electrode arrangement of claim 1, further comprising at least one post insulator.

10. The high voltage electrode arrangement of claim 9, further comprising at least one pedestal insulator on which the at least one post insulator is arranged.

11. The high voltage electrode arrangement of claim 1, wherein the electric equipment to be interconnected includes one or more of busbars, bushings, transformers, valves, surge arresters and support insulators.

* * * * *